US006527012B1

(12) United States Patent
Weber

(10) Patent No.: US 6,527,012 B1
(45) Date of Patent: Mar. 4, 2003

(54) HYDROPNEUMATIC PRESSURE ACCUMULATOR

(75) Inventor: Norbert Weber, Sulzbach/Saar (DE)

(73) Assignee: Hydac Technology GmbH, Sulzbach/Saar (DE)

(*) Notice: Subject to any disclaimer, the term of this patent is extended or adjusted under 35 U.S.C. 154(b) by 0 days.

(21) Appl. No.: 09/979,267

(22) PCT Filed: Mar. 10, 2000

(86) PCT No.: PCT/EP00/02083

§ 371 (c)(1), (2), (4) Date: Nov. 21, 2001

(87) PCT Pub. No.: WO00/73663

PCT Pub. Date: Dec. 7, 2000

(30) Foreign Application Priority Data

May 29, 1999 (DE) ........................................ 199 24 807

(51) Int. Cl.[7] ................................................ F16L 55/04

(52) U.S. Cl. ............................ 138/31; 138/30; 220/721

(58) Field of Search ............................. 138/30, 31, 26; 239/533.7; 220/721

(56) References Cited

U.S. PATENT DOCUMENTS 5,638,868 A * 6/1997 Loran .......................... 138/30

6,286,552 B1 * 9/2001 Shimbori et al. ............. 138/30

FOREIGN PATENT DOCUMENTS

| | | | |
|---|---|---|---|
| DE | 3901261 | * 7/1990 | .................. 138/30 |
| JP | 57158154 | 9/1982 | |
| JP | 08121401 | 5/1996 | |
| WO | 9746823 | 12/1997 | |

* cited by examiner

*Primary Examiner*—Patrick Brinson
(74) *Attorney, Agent, or Firm*—Roylance, Abrams, Berdo & Goodman, L.L.P.

(57) ABSTRACT

A hydropneumatic pressure accumulator, includes a gas chamber, an oil chamber, and a pair of metal bellows separating the chambers. An end plate is displaced according to volume changes in the gas chamber and oil chamber. A valve releases and blocks the flow of hydraulic fluid out of and into the oil chamber and has a valve lifter that controls the valve. During the displacement of the end plate, corresponding to a volume expansion in the gas chamber exceeding a predetermined maximum value, the valve lifter can be displaced by the end plate into a position which blocks the valve. The valve lifter is connected in a fixed manner to the end plate of the metal bellows. The valve can be blocked in two opposing directions by the displacement of the valve lifter.

6 Claims, 2 Drawing Sheets

HYDROPNEUMATIC PRESSURE ACCUMULATOR

FIELD OF THE INVENTION

The present invention relates to a hydropneumatic pressure accumulator comprising a gas chamber, an oil chamber and a metal bellows having an end plate movable in response to volume changes in the gas chamber and oil chamber. A valve releases or shuts off flow of hydraulic fluid from and into the oil chamber, respectively. A valve lifter controls the valve, and can be moved by the end plate into a position closing the valve in the event of movement of the end plate, corresponding to an increase in the volume of the gas chamber, exceeding an assigned maximum value.

BACKGROUND OF THE INVENTION

In metal bellows accumulators, limitation of the stroke for expansion and contraction of the metal bellows in response to movements of the end plate is known to be necessary to protect the bellows from overloads. In a conventional pressure accumulator of this type (cf. WO 97/46823), for such limitation, the lifter of the valve adjoining the oil chamber is mounted relative to the end plate of the metal bellows in a positional relationship such that the end plate impinges on the valve lifter when a desired end position is reached and displaces the valve when in the shut-off position so that outflow of hydraulic fluid from the oil chamber is prevented when this end position is reached. Consequently, when the valve is closed, a pressure is maintained in the oil chamber of the accumulator which corresponds to the pressure currently prevailing in the gas chamber, even if the connected hydraulic system is to remain without pressure, so that pressure equalization prevails on the metal bellows.

While overloading of the bellows is prevented in the event of absence of pressure from the connected hydraulic system, the danger nevertheless exists of damage to the bellows in the event of states characterized by excess pressure prevailing on the oil side or in the event of absence of prefill pressure on the gas side.

In this case the end plate moves to the point of mechanical impingement on the accumulator housing when the bellows is extended. In the event of such mechanical restriction of the stroke, the bellows is subjected to the action of a pressure difference corresponding to the excess pressure created on one side, which pressure difference may lead to destruction. Consequently, the use of thicker, multilayer metal bellows has been imposed up to this point. As a disadvantageous result, the spring rigidity is greatly increased and the path of the individual turns of the bellows reduced. The use of thicker multilayer metal bellows results not only in greater weight, but also in relatively poor response to changes in pressure.

A generic hydropneumatic accumulator is disclosed in FIG. 4 of PATENT ABSTRACTS OF JAPAN, Vol. 1996, No. 09, Sep. 30, 1996 (1996-09-30) and JP 08 121401 A (NOK), May 14, 1996 (1996-05-14), with a gas chamber, an oil chamber and a metal bellows separating these chambers. The metal bellows has an end plate movable in response to volume changes from the gas chamber to the oil chamber. Inside the housing enclosing the metal bellows, the housing is penetrated by a separating plate with a fluid connection. The fluid connection carrying fluid delimits the inside of the metal bellows with the inside of an additional fluid chamber within the housing. The additional fluid chamber in that location is connected externally by a hydraulic connection carrying fluid on the bottom side of the housing with sections of a hydraulic circulation system. A valve lifter connected with the end plate of the metal bellow has a closing element. Both sides of the closing element facing each other are in the form of a valve cone and capable of being brought into contact firstly with a valve seat positioned on the separating plate, and secondly, with a valve seat in the hydraulic connection on the bottom side pointing in the direction of the inside of the additional fluid chamber. The apexes of the tapered surfaces of the valve cones and the valve seats both face away from each other, with the tapered surfaces yielding good sealing behavior. Due to the additional fluid chamber, this conventional device builds up pressure on a large scale and in response to fluid volume to be moved in the metal bellows. In the additional fluid chamber, the control behavior of the valve is inhibited so that at least short-term overloads of the metal bellows can occur.

SUMMARY OF THE INVENTION

Objects of the present invention are to provide a pressure accumulator having oil and gas chambers separated by a metal bellows in which overloads of the metal bellows during operation can be prevented.

In a hydropneumatic pressure accumulator of the present invention, these objects are attained by the hydraulic connection containing a valve with two valve seats. The apexes of the tapered surfaces of both valve seats and both valve cones face each other. The valve seats are positioned axially between the valve cones. As a result, a compactly designed hydro accumulator is devised. Also, actuation of the valve in the hydraulic connection is accorded directly by the end plate of the metal bellows. Based on the low fluid volume to be controlled in the metal bellows, even in addition to a reduction of weight in contrast to the conventional solutions, especially good response behavior results. Furthermore, overloads of the metal bellows are prevented.

When, in operation of the pressure accumulator of the present invention, pressure equalization has been established between gas prefill pressure in the gas chamber and hydraulic pressure in the oil chamber and the end plate of the metal bellows is between the end positions assigned to it with the oil valve open, this operating condition of equalization of pressure on the bellows is maintained, no matter how sharply the hydraulic pressure of the oil side may drop relative to the gas prefill pressure. When the desired end position is reached, the valve closes and flow from the oil chamber is prevented. No matter how sharply the hydraulic pressure may rise relative to the gas prefill pressure, the valve is closed when the pertinent end position of the end plate is reached, so that flow into the oil chamber is no longer possible.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
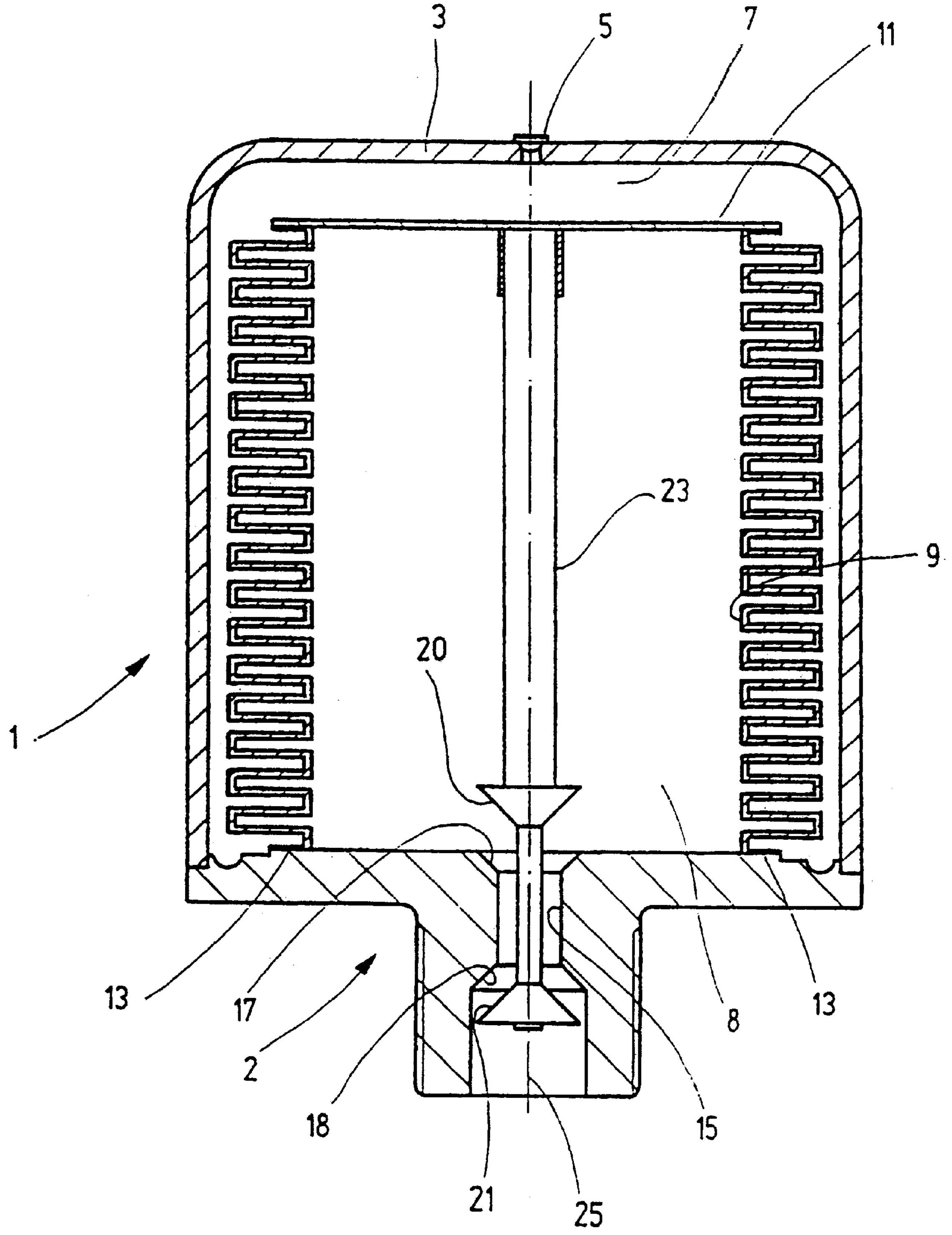
FIG. 1 is a side elevational view in section schematically illustrating a pressure accumulator according to a first embodiment of the present invention.

The pressure accumulator shown in FIG. 1 has a housing, designated as a whole by 1, with a more or less cylindrical interior. The housing 1 is provided with a hydraulic connection 2 on its bottom side, and has in its cover element 3, opposite the hydraulic connection 2. A gas filling opening is closed by a plug 5. The gas filling opening makes it possible to establish a desired gas prefill pressure in the adjoining gas chamber 7 by filling it with a compressible gas. A metal bellows 9 is cylindrical in shape, is closed by an end plate 11 on one end, and serves as separating element between this gas chamber 7 and an oil chamber 8 to which a hydraulic system (not shown) is connected. The outer diameter of the bellows 9 is somewhat smaller than the inner diameter of the housing 1. On its open end opposite the end plate 11, the bellows 9 is tightly welded to the housing 1 at point 13, so that the bellows 9 forms a tight separating element together with the end plate 11 between the oil chamber 8 (which in FIG. 1 is the interior of the bellows) and the gas chamber 7.

The hydraulic connection 2 contains a double acting oil valve 15 with two valve seats 17 and 18 each of which is formed by tapered surfaces. Operating with the valve seats 17 and 18 are closing elements in the form of valve cones or frustoconical closing elements 20 and 21 mounted on a valve lifter 23. Valve lifter 23 is mounted on the inside of the end plate 11 of the bellows 9 and can be moved back and forth together with the end plate 11 during the stroke movements of the latter along a longitudinal axis 25. The axial distances on the longitudinal axis 25 between valve seats 17 and 18 and between the associated valve cones 20 and 21 on valve lifter 23 are selected so that, with an assigned stroke path length of the downward movement of the end plate 11 in FIG. 1, if the hydraulic pressure in the oil chamber 8 becomes smaller than the gas prefill pressure, the valve cone 20 reaches the valve seat 17 as soon as the end plate 11 has reached a desired end position during this stroke movement. Consequently, the oil valve 15 is closed, so that no more hydraulic fluid can flow from the oil chamber 8, and the hydraulic pressure in the oil chamber 8 remains constant. With the end plate 11 in this position, pressure equilibrium is established on the bellows 9.

In the case of stroke movement in the opposite direction (upward in FIG. 1) as a result of increase in hydraulic pressure, the valve cone 21 comes to rest against the valve seat 18 to close the oil valve 15 when the end plate 11 reaches the pertinent end position. The flow of hydraulic fluid into the oil chamber 8 is then prevented, and again, pressure equilibrium is established on the bellows 9 between oil chamber 8 and gas chamber 7 to define the corresponding end position of the end plate 11.

Figure 2:
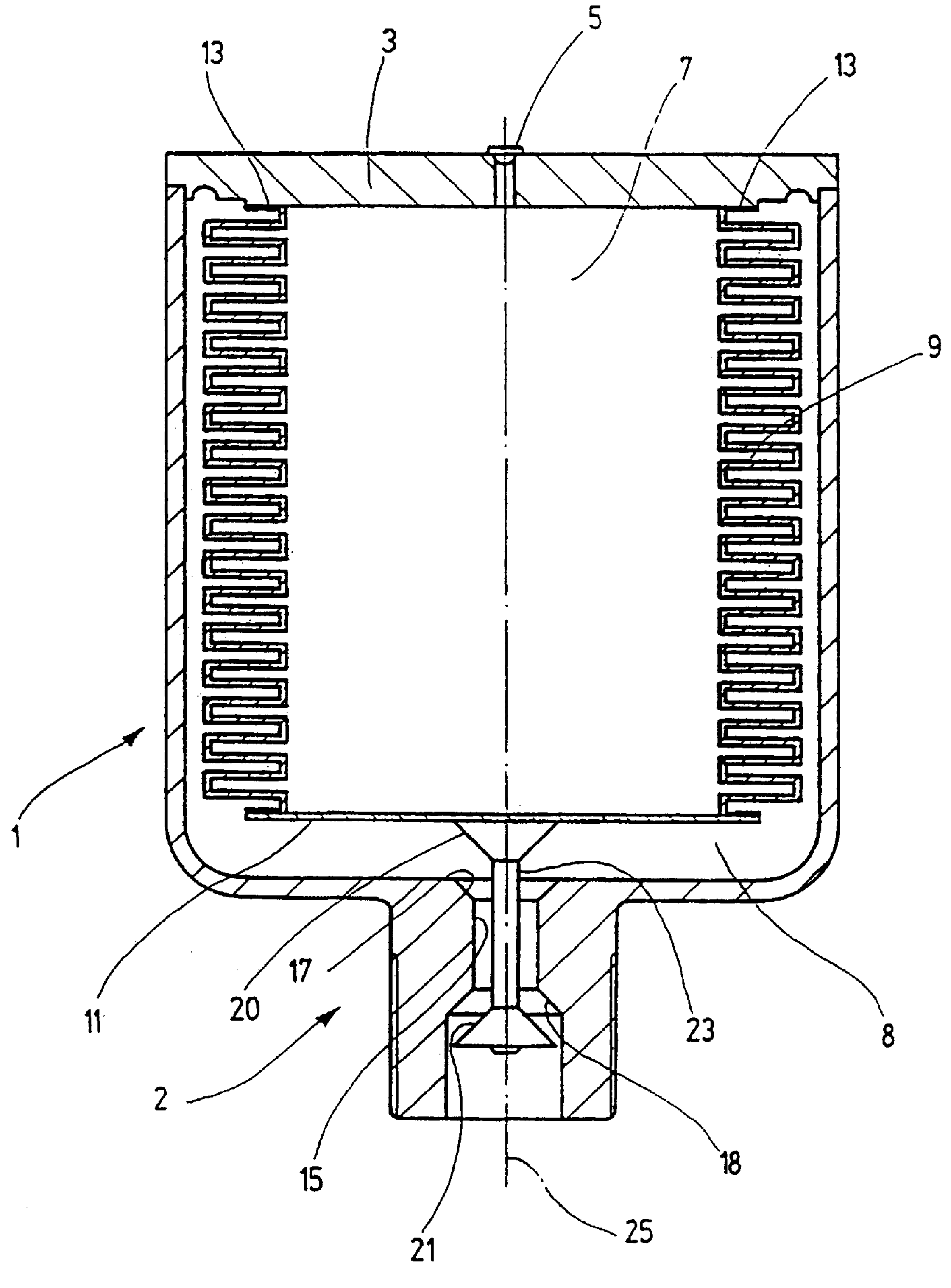
FIG. 2 is a side elevational view in section schematically illustrating a pressure accumulator according to a second embodiment of the present invention.

In contrast to the exemplary embodiment shown in FIG. 1, in the second embodiment illustrated in FIG. 2, the interior of the bellows 9 faces the cover element 3 of the housing 1 where the gas connection is situated. The interior of the bellows 9 forms the gas chamber 7, while the exterior of the bellows 9 delimits the oil chamber 8 into which the hydraulic connection 2 empties. In the second embodiment, the valve lifter 23 of the oil valve 15 is fastened on the exterior of the end plate 11 of the bellows 9. Operation is the same as in the example presented in FIG. 1. At the ends of the stroke movements of the end plate 11 in both directions along the longitudinal axis 25, the valve cones 20, 21 reach the respective end positions to rest against the respective valve seats 17 or 18 to shut off delivery or drainage of hydraulic fluid into or out of the oil chamber 8 and to define the respective end positions of the end plate 11 of the bellows 9.

In both exemplary embodiments, the apexes of the tapered surfaces of the valve cones 20 and 21 face each other. The valve seats 17 and 18 are spaced axially between the valve cones 20 and 21. With this layout, a pressure gradient, such as would result should valve 15 on bellows 9 not be fully closed, advantageously results in corresponding increase in the contact pressure between valve cones 20 or 21 and the pertinent valve seats 17 or 18.

In the figures, the axial spacings of the valve seats 17 and 18 of the valve 15 and valve cones 20 and 21 are indicated only as examples. These spacings may be selected, at option, so that a desired operating stroke length results between the pertinent hydropneumatically defined end positions for the end plate 11 of the bellows 9 during operation.

While various embodiments have been chosen to illustrate the invention, it will be understood by those skilled in the art that various changes and modifications can be made therein without departing from the scope of the invention as defined in the appended claims.

What is claimed is:

1. A hydropneumatic pressure accumulator, comprising:

a housing;

an oil chamber in said housing;

a gas chamber in said housing;

a metal bellows separating said oil and gas chambers and having an end plate movable within said housing in response volume changes in said gas chamber and said oil chamber; and a valve controlling flow of hydraulic fluid out of and into said oil chamber, said valve having a valve lifter rigidly connected to said end plate to control positioning of said valve in response to movement of said end plate and to move said valve between two mutually closed positions corresponding to end positions of said end plate at an assigned maximum gas chamber volume and at an assigned minimum gas chamber volume, respectively, said valve having first and second valve seats with tapered surfaces spaced at a distance from one another in an axial direction of said valve corresponding to directions of movement of said valve lifter, said valve lifter having first and second frustoconical closing elements spaced at a distance from one another in said axial direction, said tapered surfaces of said valve seats having apexes facing one another, said closing elements having apexes facing one another, said valve seats being positioned axially between said closing elements;

whereby, when said end plate moves to a position corresponding to the maximum gas chamber volume or the minimum gas chamber volume, one of said closing elements is received in the respective valve seat to close said valve.

2. A hydropneumatic pressure accumulator according to claim 1 wherein said valve is provided at an open end of said metal bellows opposite of said end plate, said metal bellows having an interior forming said oil chamber, said valve lifter extending through said oil chamber to a fastening thereof on an interior side of said end plate.

3. A hydropneumatic pressure accumulator according to claim 1 wherein said end plate faces said valve, said metal bellows having an interior forming said gas chamber, said oil chamber being on an outer side of said metal bellows, said valve lifter being fastened externally on said end plate.

4. A hydropneumatic pressure accumulator according to claim 3 wherein axial spacings between said valve seats and between said closing elements maintain said valve open when said end plate and said valve lifter move along a desired stroke distance between said end positions.

5. A hydropneumatic pressure accumulator according to claim 2 wherein axial spacings between said valve seats and between said closing elements maintain said valve open when said end plate and said valve lifter move along a desired stroke distance between said end positions.

6. A hydropneumatic pressure accumulator according to claim 1 wherein axial spacings between said valve seats and between said closing elements maintain said valve open when said end plate and said valve lifter move along a desired stroke distance between said end positions.

* * * * *